United States Patent [19]

Tajkowski

[11] 4,438,026

[45] Mar. 20, 1984

[54] SOLVENT DEWATERING COMPOSITION

[75] Inventor: Edward G. Tajkowski, Williamsville, N.Y.

[73] Assignee: Allied Corporation, Morris Township, Morris County, N.J.

[21] Appl. No.: 470,342

[22] Filed: Feb. 28, 1983

[51] Int. Cl.$^3$ .............. C11D 1/34; C11D 1/68; C11D 3/43; C23G 5/02
[52] U.S. Cl. ................................ 252/545; 252/153; 252/171; 252/174.16; 252/194; 252/358
[58] Field of Search .............. 252/194, 358, 153, 171, 252/174.16, 545

[56] References Cited

U.S. PATENT DOCUMENTS

| | | | |
|---|---|---|---|
| 3,397,150 | 8/1968 | Burt et al. | 252/194 |
| 3,903,012 | 9/1975 | Brandreth | 252/194 |
| 4,383,932 | 5/1983 | Hisamoto et al. | 252/194 |
| 4,401,584 | 8/1983 | Tajkowski et al. | 252/194 |

*Primary Examiner*—John E. Kittle
*Assistant Examiner*—Mukund J. Shah
*Attorney, Agent, or Firm*—Arthur J. Plantamura; Jay P. Friedenson; Richard C. Stewart, II

[57] ABSTRACT

Water-displacing compositions based on fluorocarbon solvent FC-113 (1,1,2-trifluoro-1,2,2-trichloroethane) and certain surfactants are provided. These solutions serve to displace water from a broad range of substrates, including metals such as stainless-steel, aluminum alloys and brass, as well as from glass and ceramic surfaces such as lime glasses, borosilicate glass, unglazed alumina and fired alumina. In addition, these compositions do not form emulsions with the displaced water. This latter property is important to efficient water removal by decantation when the drying solvent is used in commercial drying processes and apparatus.

The surfactants are chosen from a combination of: (a) the isopropyl amine salt of a dodecylbenzene sulfonic acid; (b) 2,4,7,9-tetramethyl-5-decyn-4,7-diol combined with an aliphatic primary alcohol in the range of hexanol to dodecanol; and (c) certain aliphatic esters of polyphosphoric acid, in the free-acid form. This combination of ingredients, in appropriate weight relationships to each other, is present in the dewatering solution at a total weight of about 0.5 percent based on the fluorocarbon solvent.

6 Claims, No Drawings

SOLVENT DEWATERING COMPOSITION

DESCRIPTION

This invention relates to improved surfactant-solvent drying compositions which include a volatile solvent that has the capability of removing water or other aqueous films from the surfaces of a broad range of substrates, including metal, glass and ceramics. Removal of the water from the substrate to be dried is effected by displacement; drying in this manner avoids an energy consuming drying step and greatly expedites subsequent processing of the substrate component.

BACKGROUND OF THE INVENTION

Volatile solvent drying compositions used in the past have often proved less than satisfactory by failing to effectively displace water from the surface to be dried. Also, although some compositions in the past have proven effective to displace water from some substrates such as metal, e.g. stainless steel, aluminum and brass, they have not been practically effective on nonmetallic surfaces, such as glass or ceramic.

An additional and serious problem encountered with varying severity in the use of solvent drying solutions, depending on the specific application and substrate to be dried, is the fact that such solutions tend to emulsify or otherwise generate agglomerates and are difficult to purify or to be freed of aqueous impurities so that the drying solution can be reused. The presence of emulsions or other non-soluble formations in these drying compositions interferes with the free elimination of water, such as by decantation, and ultimately interrupts the water-displacement process which is the essential objective of the substrate drying treatment.

It is thus apparent that a need exists for an effective solvent/surfactant drying or surface dewatering system and, particularly, a system which can be used on a broad range of substrates that includes metals as well as glass and ceramics and in which the dewatering composition is readily renewable by separating the water accumulated therein during use without encountering substantial interference by the presence of an emulsion phase.

SUMMARY OF THE INVENTION

It is an object of the present invention to provide drying solvent compositions with improved drying capabilities and broader application and that can suitably withstand severe use by their water desorption and rejection abilities. A more particular object of the invention is to provide an effective drying solvent composition that resists the formation of stable emulsion and is effective for use in drying glass and ceramic substrates as well as metal.

The drying solvent composition of the invention comprises the fluorocarbon solvent trichlorotrifluoroethane, FC-113, containing stoichiometric isopropylamine salt (or adduct) of a "soft" (biodegradable) dodecylbenzenesulfonic acid (DDBSA) as the primary surfactant. This compound is freely soluble in the FC-113 and displaces water from many substrates.

To overcome the tendency to form emulsions with the displaced water, a combination of 2,4,7,9-tetramethyl-5-decyn-4,7-diol and n-octanol is added to the formulation. In addition, a small amount of a phosphoric acid ester, in the free-acid form, imparts to the composition the property of displacing water from glass and ceramic surfaces as well as from metal surfaces. Phosphoric acid ester compounds especially suitable to provide the desired result are characterized as:

(a) The phosphate additive should preferably be an ester of an aliphatic alcohol of moderate chain length excluding esters having a polyoxyethylene structure; and (b) Such esters should be preferably polyphosphates, (i.e. obtained from the dimeric acid derived from $P_2O_5$). Typical preferred products are the aliphatic esters of phosphoric acid in which the aliphatic substituent has 4 to 12 carbon atoms. While other phosphate esters exhibit some measure of water-displacing properties on glass, etc., they lack the same relative efficiency as those of the present invention.

DESCRIPTION OF THE PREFERRED EMBODIMENTS

In accordance with the invention, solvent-drying compositions are described which are very effective in displacing water from a broad range of substrates of different compositions. In particular the drying compositions of the invention serve to displace water from various common substrates, including metals, such as stainless steel, aluminum alloys and brass; from glass and ceramic surfaces, such as lime glasses, borosilicate glass, unglazed alumina and fired alumina. In addition, the drying compositions of the invention do not form emulsions with the displaced water. This latter property is important for practical, efficient water removal by decantation when the drying solvent is used in commercial drying apparatus because, for example, it avoids clogging of equipment and process delays.

In the solvent-drying solutions of the invention, the organic fluorocarbons are those compositions having a boiling point range of between about 45° C. and 50° C., specifically the trichlorofluoroethanes. The fluorocarbon, FC-113, (1,1,2-trichloro-1,2,2-trifluoroethane), is particularly effective. The solvent-drying system, which is described in detail below, comprises an additive package that is combined with the fluorocarbon. The additive package comprises a total amount of less than about one percent by weight of the FC-113 and is formulated to accomplish the desired objects of:

Displacing water from metals such as aluminum, brass, stainless steel and others.

Displacing water from lime glasses, borosilicate glass (PYREX®), unglazed alumina, fired alumina, silica (as on Si wafers used for miniaturized electronic circuits) and others.

Not forming appreciable stable emulsions with the displaced water.

Functioning reliably with a minimum of attention, to control the composition of the dewatering bath.

The surfactants which comprise an essential part of the additive package which is added to the fluorocarbon are chosen from a combination of the following four components: (1) the isopropyl amine salt of linear dodecylbenzene sulfonic acid; (2) 2,4,7,9-tetramethyl-5-decyn-4,7-diol in combination with (3) an aliphatic primary alcohol in the range of hexanol to dodecanol; this combination of the diol and the aliphatic primary alcohol is disclosed in the co-pending application of E. G. Tajkowski, et al. entitled "Solvent Based Dewatering System With Demulsifier", filed on May 17, 1982, Ser. No. 379,241; and (4) certain aliphatic esters of phosphoric acid, in the free-acid form. This combination of ingredients, modified in accordance with the invention and in appropriate weight relationships to each other, is present in the dewatering solution in a total weight of about 0.5 percent.

The combined additives (1), (2), (3) and (4) with the fluorocarbon solvent produces the advantageous dewatering system of the invention. Specifically these additives comprise:

The stoichiometric isopropylamine salt (or adduct) of a "soft" (biodegradable) dodecylbenzenesulfonic acid (DDBSA) as the primary surfactant. This ingredient is obtainable commercially, for example, under the brand name BIO-SOFT S-100, from Stepan Chemical Co. Equivalent DDBSA may be obtained from other sources, as well. This is the primary surfactant of the composition of the invention and is freely soluble in FC-113 and displaces water from many substrates.

To overcome the tendency of the DDBSA surfactant to form an emulsion with the displaced water, a combination of (a) 2,4,7,9-tetramethyl-5-decyn-4,7-diol, available commercially as SURFYNOL 104 from Airco Chemical Company, and (b) n-octanol is added to the formulation in amounts of between about 0.05 to 1 weight percent. Although the above combination is effective to dry metals, it does not effectively dry glass or ceramics.

To effect the drying of glass and ceramic, I have found that the addition of a small amount of an ester of poly phosphoric acid, in the free-acid form, imparts the property of displacing water from glass and ceramic surfaces. Suitable phosphoric acid esters are characterized as follows:

(a) The phosphate additive should preferably be an ester of aliphatic alcohol of moderate chain length, i.e., from about 4 to 12 carbon atoms; the esters of polyoxyethylene structures are not found to be satisfactory.

(b) The esters are polyphosphates (i.e., made from the dimeric phosphoric acid derived from $P_2O_5$); while other phosphate esters are found to exhibit some measure of water-displacing properties on glass, etc., none act as efficiently as the dimeric acid polyphosphate esters. An ester of this kind is available under the brand name STRODEX MO-100 from Dexter Chemical Co.

In order to differentiate qualities of performance among the various compositions, for ability to displace water from wet substrates and for ability to give good separations between water and solvent phases, the following test methods were used. The "Minimum Time Test" measures the efficiency of water-displacement performance and is conducted as follows:

WATER DISPLACEMENT PERFORMANCE—"MINIMUM TIME TEST"

(1) A stainless-steel beaker, of about 2-liter capacity, is fitted with a cooling-coil of several turns of tubing that conforms closely to the inner surface of the upper part of the beaker. The coil is connected to a source of cooling fluid. This arrangement is referred to as a "boiling sump".

(2) The boiling sump is charged with 500 ml of the solution to be tested and is placed upon a thermostatted hot plate. The solution is heated to a rolling boil and vapors are refluxed off the surface of the cooling coil.

(3) Specimens, i.e., "coupons" having an approximate size 18 mm×76 mm (about 182 inches by 3 inches), of the substrates to be tested are pre-cleaned to a condition of no-water-break cleanliness (a terminology used by those who work in the field of surface-finishing metals and other substrates to refer to a surface condition essentially free of oil film). The coupons are attached to suspension means and are wetted with water just prior to the test. The wetted coupon is completely immersed for a pre-determined time, e.g., ten seconds, in the boiling test solution. It is then raised into the vapor region above the liquid and held there for 30 sec. The coupon is then removed and examined for the presence of water on the surface. If it is dry, the process is repeated with fresh, wet coupons for shorter immersion times until "failure", i.e., a wet surface, occurs after the complete cycle of immersion in liquid and vapor. If the coupon is wet at ten seconds, then longer immersion times are used, successively, until complete water-displacement, i.e., a dry surface, is accomplished. "Minimum time for displacement" is reported as the immersion times (in seconds) obtained between "wet" and "dry" surface conditions upon removal from the boiling sump. The shorter the time for drying, the better the water-displacement efficiency.

The "Phase-Separation Rate Test" outlined below measures the relative rates for separation of the water and solvent phases which is related to the tendency for emulsion formation and is conducted as follows:

PHASE-SEPARATION TEST (1) This test simulates the agitation imparted to a liqud by a centrifugal circulating pump such as may be found on a vapor-phase degreasing machine that has been modified to perform an efficient water-displacement function. This test also measures the relative rates of separation for aqueous and solvent phases after the end of the agitation period. The more rapid and complete the separation of the phases, the more potentially useful is the solvent-surfactant composition in a drying machine.

(2) The test is run in a Waring Blender (Waring Products Co.), Model 1088. The test is done at "low" speed and the built-in timer is set for a ten-second running time. A one-pint blender jar with a tightfitting screw cap is used for agitation. Separation rate measurements are made in eight-ounce, tall, straight-sided wide-mouth glass jars that have screw caps.

(3) The test is conducted with a 180 ml portion of the solvent solution in the jar of the blender. To this portion is added 18 ml (10 vol%) of the aqueous phase material: water, or other aqueous process solution. The jar is closed tightly and the blender is run at "low" speed for ten seconds. The dispersion is immediately poured over into a measurement jar and the initial time is noted. Total volume height in the jar is measured along the outside of the jar with a ruler or dividers. Further readings of the depths of each phase are taken at 5, 10, 20, 30 and 60 min. of elapsed time after pour over. For each reading, the depth of each clear phase, from its top or bottom to the corresponding surface at the interface layer, is measured.

(4) These depths are then calculated as volume percents of the original total volume, or as proportions of the original phase volumes. The volume proportions may then be plotted against elapsed time for each phase and curves are obtained that show relative separation dynamics for the various mixtures. Alternatively, separation percentages for the phases at 30 and/or 60 minutes may be used for quickly comparing relative performances of the mixtures being tested.

(5) In each case, any formation of a stable emulsion in a phase or at the interface is noted. The depth of such an emulsion is subtracted from the depth of corresponding clear phase for purposes of calculating the percent separation of that phase. For example, a stable emulsion in the aqueous phase after 60 minutes standing is zero separation of that phase, even if the solvent phase becomes completely clear.

Another performance test which may be used (Boil Emulsification Test) measures the ability of a given mixture to resist emulsification in the presence of accumulated water in the boiling sump or in the phase-separation chamber that usually is a necessary part of the solvent-drying apparatus. This test is outlined below:

BOIL EMULSIFICATION TEST (1) A boiling sump, as described for the "Minimum Time Test" above, is used. The vessel is charged with 500 ml of the solvent-surfactant mixture to be evaluated and 50 ml of distilled water are added.

(2) The solvent-water mixture is boiled under reflux for 60 min. and then observed for the presence or absence of an emulsified phase at the interface or in either layer. A preferred condition is that no emulsion phase should be formed in this test.

(3) A further observation of the relative performances of such mixtures may be obtained by transferring the solvent-water mixture, after the refluxing period, to a suitable closed glass container and noting the separation of phases. No emulsion is preferred. A dispersion that separates clearly in a short time is satisfactory. A stable emulsion, or one that breaks only slowly, is undesirable.

An example of a suitable formulation which uses the DDBSA as the primary surfactant in accordance with the invention is given by the following:

| a. | DDBSA (BIO-SOFT, S-100) | 0.2380 parts (wt.) |
|---|---|---|
|    | Isopropylamine (IPAm) | 0.0432 parts (wt.) |
| b. | SURFYNOL 104 | 0.0375 parts (wt.) |
|    | n-octanol | 0.0563 parts (wt.) |
| c. | STRODEX MO-100 | 0.0250 parts (wt.) |
|    | FC-113 (GENESOLV D) | 99.6000 parts (wt.) |
|    |  | 100.0000 parts (wt.) |

The components of this formulation are preferably used in the following approximate ratios:
DDBSA IPAm/(SURFYNOL+octanol)=3/1
SURFAYNOL/octanol=2/3
MO-100/balance of surfactants)=1/15
(Total surfactant pkg)/FC-113=0.40/99.60

Phase separation as well as water-displacement performances were tested by the methods described above and previously described in the aforementioned co-pending application Ser. No. 379,241 now U.S. Pat. No. 4,401,584. The solution phase-separated rapidly and cleanly.

Typical minimum times for water-displacement for standard, wet substrates using this drying formulation are set forth in Table I:

TABLE I

| Material | Drying Time |
|---|---|
| stainless steel | 1–3 sec. |
| lime glass | 8–10 sec. |
| PYREX glass | 3–5 sec. |
| unglazed spark plug body | 3–5 sec. |

TABLE I-continued

| Material | Drying Time |
|---|---|
| Coors $Al_2O_3$ wafer | 2–5 sec. |

I have found that the dodecylbenzene sulfonic acid salt to be suitable in practicing the invention must be biodegradable or "soft" and that a branched-chain "hard" DDBSA was found to be unsuitable for this solvent-surfactant system; in particular, when a branched-chain DDBSA was used, it did not pass the phase-separation test.

The evaluation of aliphatic amines other than isopropyl, i.e., n-propyl, sec-butyl, -t-butyl, -n-hexyl, -cyclohexyl-, n-octyl-, 2-ethyl hexyl and cocoyl-, converted to stoichiometric salts for the test formula I, demonstrated that none are comparable in performance to isopropylamine salts.

Tests to determine whether the substitution of fluorocarbon solvents other than FC-113 could be used demonstrated that solvents other than FC-113 are not comparable in dewatering performances to FC-113, most notably because such other fluorocarbons form stable emulsions in the phase-separation test.

Suitable polyphosphoric acid esters are those derived from the reaction product of the polyphosphoric acid and aliphatic alcohols of from 4 to 12 carbon atoms.

In addition to (a) the primary dodecylbenzene sulfonic acid-amine salts and (b) the polyphosphoric acid ester surfactants, the additive package includes a suitable demulsifier composition.

The demulsifier which may be employed in amounts comparable to the surfactant, i.e., in an amount of from about 0.05 weight percent to about 1 weight percent and, preferably in amounts of about 0.1 to about 0.5 weight percent, is one or more of those from the following group:

1. acetylenic diols such as 2,4,7,9-tetramethyl-5-decyn-4,7-diol, available commercially as SURFYNOL 104 from Airco Chemical Co.

2. aliphatic primary alcohols having from six to twelve carbon atoms, preferably the n-octyl alcohol.

3. phosphate esters having alkoxy substituents of three to twelve carbon atoms, typically, tri-n-butyl phosphate.

The relative weight of demulsifier to surfactant in the composition may vary from about a ratio of 1:8 to 8:1, but preferably is maintained within the ratio of 1:4 to 4:1.

It has been found that even more beneficial results are derived when the demulsifier materials are used in combination with each other, e.g., such as by combining the acetylenic diol type with the primary aliphatic alcohol type, or with the phosphate tri-ester type. The relative proportions of the two types of demulsifiers may vary from 1:4 to 4:1 parts by weight. For example, a preferred composition would include a 2:3 weight ratio of the 2,4,7,9-tetramethyl-5-decyn-4,7-diol to n-octanol as the demulsifier material.

It has been found that the compositions of the present invention possess certain desirable advantages over prior art compositions in that a solvent as described may be used for relatively long periods without formation of significant amounts of stable emulsion, thereby avoiding the difficulties in recirculating the solvent and avoiding clogging of the circulating apparatus.

Specific examples of the effectiveness of the compositions of the invention are summarized in the following tables. Parts and percentages are expressed by weight except as otherwise noted.

The tables which follow show mixtures and surfactants of the invention with solvent and with demulsifier additives; in comparative runs these were used for choosing advantageous surfactant compositions. Performance results are for these mixtures when tested according to the methods described above.

IV indicates that not only are those solvents not comparable in dewatering performances to FC-113, but they form stable emulsions in the phase-separation test.

TABLE IV

COMPARATIVE PERFORMANCES OF FC 113, FC 11 AND FC 123 IN THE "X" AND "X-P" DEWATERING SYSTEMS

| System | % Aq. Phase Sep'n @ 60' | Min. Time for Dewatering, Sec. | | | |
|---|---|---|---|---|---|
| | | Al | Brass | SS304 | Glass |
| FC-113, X[a] | 95 | 1–2 | 2–3 | 10–11 | N.D. |
| FC-113, X-P[b] | 95 | 1 | 1 | 1 | 1 |
| FC-11, X | E[1] | 5–8 | 3–4 | N.D. | N.D. |
| FC-11, X-P | E[1] | 1 | 1 | 1 | N.D. |
| FC-123, X | E[2] | 1 | 2–3 | 1 | N.D. |

TABLE II

COMPARATIVE PERFORMANCES OF "HARD" AND "SOFT" DODECYLBENZENE SULFONIC ACIDS FOR PHASE-SEPARATION AND DEWATERING

| System (See below)[1] | % Aq. Phase Sep'n @ 60' | Min. Time for Dewatering, Sec. | | | | |
|---|---|---|---|---|---|---|
| | | Al | Brass | SS304 | Glass | Al$_2$O$_3$ |
| S-100.i-Pr Am[2] | 50 | 1 | 1 | 1 | N.D. | — |
| H-100.i-Pr Am[3] | 95 | 8–10 | 8–10 | 8–10 | N.D. | — |
| S-100.i-Pr Am/X | 95 | 1–2 | 2–3 | 10–11 | N.D. | — |
| H-100.i-Pr Am/X | 86 | 8–10 | N.D. | N.D. | N.D. | — |
| S-100.i-Pr Am/X-P | 95 | 1 | 1 | 1 | 1 | 1 |
| H-100.i-Pr Am/X-P | E | NOT TESTED | | | | |

[1]DDBSA.i-Pr AMINE at 0.25% in FC 113
"X" = ABOVE PLUS 0.25% D-M PKGE, at 0.5% TOTAL
"X-P" = ABOVE PLUS 0.10% STRODEX MO-100, at 0.6% TOTAL
[2]BIO-SOFT S-100, LINEAR (SOFT) DDBSA, STEPAN CHEMICAL CO.
[3]STEPANTAN H-100, BRANCHED CHAIN (HARD) DDBSA, STEPAN CHEMICAL CO.
STEPANTAN 100 was found to be unsuitable for this solvent surfactant system; in particular, it did not pass the phase-separation test.
N.D. = No Drying
E = Stable Emulsion Aliphatic amines other than isopropyl were evaluated with BIO-SOFT S-100: n-propyl, sec-butyl, -t-butyl,-n-hexyl, -cyclohexyl-, n-octyl-,2-ethyl hexyl and AR-MEEN C (cocoyl-) were made into stoichiometric salts for the test formula. None were comparable with isopropylamine for overall performance as shown in Table III.

TABLE III

PERFORMANCE TESTS FOR VARIOUS AMINES COMBINED WITH BIO-SOFT S-100 DDBSA IN STOICHIOMETRIC QUANTITIES AND WITH DEMULSIFIER MIXTURE[1]
TESTS MADE WITH, AND WITHOUT, STRODEX MO-100 PHOSPHATE ESTER[2]

| COMPOSITION AMINE (MO-100) | % AQ. PHASE SEP'N @ 60' | MIN. TIME, SEC. | | | | |
|---|---|---|---|---|---|---|
| | | Al | Brass | SS304 | Glass | Al$_2$O$_3$ |
| i-propyl (no) | 95 | 1–2 | 2–3 | 10–11 | N.D. | — |
| i-propyl (yes) | 95 | 1 | 1 | 1 | 1 | 1 |
| n-propyl (no) | E | NO TEST | | | | |
| n-propyl (yes) | E | " | | | | |
| t-butyl (no)[3] | 50 | " | | | | |
| t-butyl (yes) | E | " | | | | |
| 2° butyl (no) | E | " | | | | |
| 2° butyl (yes) | V. BAD | " | | | | |
| n-hexyl (no) | 96 | 1 | 1 | 1 | N.D. | N.D. |
| n-hexyl (yes) | 86 | 1 | 1 | 1 | N.D. | N.D. |
| cyclohexyl (no) | E | 1 | 1 | 1 | N.D. | — |
| cyclohexyl (yes) | 50 | 1 | 1 | 1 | 20–30 | N.D. |
| n-octyl (no) | E | NO TEST | | | | |
| n-octyl (yes) | E CLR | " | | | | |
| 2et-hexyl (no) | 48 | 15–16 | 8–10 | 10–11 | N.D. | — |
| 2et-hexyl (yes) | 38 | 1 | 1 | 1 | N.D. | — |
| ARMEEN C (no)[4] | 95 | 8–10 | N.D. | 8–10 | N.D. | N.D. |
| ARMEEN C (yes) | E CLR | 1 | 1 | 1 | N.D. | N.D. |

[1]DDBSA/amine adduct = 0.25 wt. % in FC 113
SURFYNOL 104 = 0.125 wt. %
n-Octanol = 0.125 wt. %
[2]STRODEX MO-100 = 0.10 wt. %, when used
[3]t-butyl amine salt not completely soluble in FC 113
[4]cocoamine (ARMAK, INC.)
E = Stable Emulsion
E CLR = Unstable Emulsion; Separates After Several Hours Standing
N.D. = No Drying The evaluation of fluorocarbon solvents FC-11 and FC-123 for this type of formulation as shown in Table

TABLE IV-continued
COMPARATIVE PERFORMANCES OF FC 113, FC 11 AND FC 123 IN THE "X" AND "X-P" DEWATERING SYSTEMS

| System | % Aq. Phase Sep'n @ 60' | Min. Time for Dewatering, Sec. | | | |
|---|---|---|---|---|---|
| | | Al | Brass | SS304 | Glass |
| FC-123, X-P | E[(2)] | 1 | 1 | 2-3 | N.D. |

[(1)]Completely emulsified, stable o/w type
[(2)]Complete, but unstable, w/o type emulsion
N.D. = No drying
[(a)]0.25% DDBSA/i-propylamine + 0.15% SURFYNOL 104 + 0.15%
[(b)]As in [(a)] above, + 0.10% STRODEX MO-100.

A number of phosphate ester compounds other than STRODEX MO-100 were evaluated in the test formulation. These include other Dexter products that were derivatives of polyphosphoric acid. Of these, only STRODEX P-100, a co-ester of alcohols and exthoxylates, might be a limited substitute for the -MO-100. Phosphate esters of various types from several manufacturers, all based on orthophosphoric acid, were not suitable for use in this solvent-drying system. The results are shown in Tables V and VI.

TABLE V
PHASE-SEPARATION AND DEWATERING PERFORMANCE 0.1% "STRODEX" AND "DEXTROL" PHOSPHATE ESTERS ADDED TO (DDBSA/i-Pr AMINE/SURFYNOL 104/n-OCTANOL) SYSTEM

| Additive | 60' Aq. Phase Break, % | Min. Time for Dewatering, Sec. | | | |
|---|---|---|---|---|---|
| | | Al | Brass | SS304 | Glass |
| NONE | 95 | 1-2 | 2-3 | 10-11 | N.D. |
| STRODEX MO-100[1] | 95 | 1 | 1 | 1 | 1 |
| STRODEX P-100[2] | 95 | 1 | 1 | 1 | 5-10 |
| STRODEX SE-100[3] | 94 | 1 | 1 | 1 | 20-30 |
| STRODEX LF-100[4] | 94 | 1 | 1 | 1 | 15-20 |
| DEXTROL OC-15[5] | 94 | 1 | 1 | 1 | 20-30 |
| "STRODEX"[6] | cpds. are all esters of "polyphosphoric acid" ($P_2O_5$) | | | | |
| "DEXTROL"[6] | cpds. are esters of orthophosphoric acid | | | | |

[1]mono/di esters of alphi. alcohols, med. m.w.
[2]mono/di esters of alcohols and ethoxylates
[3]mono/di esters of ethoxylates
[4]"lo foam" version of P-100
[5]mono/di ester of nonyl phenoxy, (polyethylene oxy) ethanol
[6]Trademarks of Dexter Chemical Co.
N.D. = No Drying

TABLE VI
DEWATERING PERFORMANCE OF VARIOUS PHOSPHATE ESTER ADDITIVES AT 0.1% IN THE (DDBSA/i-Pr AMINE/SURFYNOL 104/n-OCTANOL) SYSTEM COMPARED WITH STRODEX MO-100

| Additive | Min. Time for Dewatering, Sec. | | | |
|---|---|---|---|---|
| | Al | Brass | SS304 | Glass |
| NONE | 1-2 | 2-3 | 10-11 | N.D. |
| STRODEX MO-100 | 1 | 1 | 1 | 1 |
| RM-410[1] | 5-10 | 3-5 | 3-5 | N.D. |
| D 70-30C[2] | 1 | 1 | 1 | 30-45 |
| CS-113[3] | 5-10 | 2-3 | 1 | 20-30 |
| PS-900[4] | N.D. | N.D. | 5-10 | N.D. |
| CS-1332[5] | 1 | 1 | 1 | N.D. |
| CS-330[6] | 3-5 | 10-11 | 1 | 30-45 |
| MAPHOS L-4[7] | 10-11 | 2-3 | 1 | N.D. |
| MAPHOS L-6[8] | 1 | 5-8 | 1 | 30-45 |

[1]GAF-Aromatic mono/di, med. m.w.
[2]WITCO/Aliphatic di, med. m.w.
[3]WITCO-Aromatic mono/di, lo-med. m.w.
[4]WITCO-Aliphatic mono/di, lo m.w.
[5]WITCO-Aromatic di, high m.w.
[6]WITCO-Aromatic mono/di, med. m.w.
[7]MAZER-Nonyl phenol mono/di, med. m.w.
[8]MAZER-Dinonyl phenol mono/di, med-hi m.w.
N.D. = No drying Two other acetylenic diols, SURFYNOL 82 and 124, were tested for use in the X-P test formulation. Of these SURFYNOL 82 was found to be equivalent to SURFYNOL 104 as a demulsifier material. SURFYNOL 124 was not suitable.

The aliphatic alcohols 2-ethylhexanol and NEODOL 91 (a mixture of $C_9$, $C_{10}$ and $C_{11}$ alcohols) were evaluated against n-octanol and found to be essentially equivalent for use with SURFYNOL as part of the demulsifier "package."

TABLE VII
ALTERNATE DEMULSIFIER ADDITIVES FOR USE IN SYSTEM "X-P"[(1)]

| Additive | Vol. % Phase Sep'n @ 60' | Min. Time for Dewatering, Sec. | | | | |
|---|---|---|---|---|---|---|
| | | Al | Brass | SS304 | Glass | $Al_2O_3$ |
| Control[(2)] | 98 | 1 | 1 | 1 | 5-10 | 5-10 |
| SURFYNOL 82[(3)] | 97 | 1-2 | -10 | 18-20 | 5-10 | 5-10 |
| Neodol 91[(4)] | 97 | 1 | 1 | 5-8 | 10-15 | 3-5 |
| TNBP[(5)] | 97 | 1 | 1 | 1 | 5-10 | 5-10 |

[(1)]"X-P" is defined as the ratios:
Linear DDBSA/i-propylamine - 2.0 parts by wt.
SURFYNOL product (acetylenic diol) - 1.5 parts by wt.
other demulsifier - 1.5 parts by wt.
STRODEX MO-100 (phosphate ester) - 1.0 parts by wt.
[(2)]SURFYNOL 104 + n-octanol.
[(3)]SURFYNOL 82 + n-octanol.
[(4)]SURFYNOL 104 + Neodol 91 ($C_9$, $C_{10}$, $C_{11}$ alkanol mixture)
[(5)]SURFYNOL 104 + Tri-n-Butyl Phosphate Tables VIII and IX deal with the effects of "total" surfactant and ratios of the phosphate ester to the balance of the surfactant.

TABLE VIII
PERFORMANCE EFFECTS ON SYSTEM "X-P"[(1)] FROM CHANGES IN TOTAL SURFACTANTS LEVEL AND "X" TO "P" RATIOS

| COMPOSITION WT. % "X"/ % MO-100 | AQ. PHASE SEP'N AT 60', % | MIN. TIME TEST, SEC. | | | | |
|---|---|---|---|---|---|---|
| | | Al | Brass | SS304 | Glass | $Al_2O_3$ |
| 0.5/0.1 (Control) | 95 | 1 | 1 | 1 | 1 | >1 |
| 0.5/0.05 | 95 | 1-2 | 1-2 | 3-5 | 20-30 | N.D. |
| 0.25/0.025 | 47 | 3-5 | 8-10 | 1 | N.D. | — |
| 0.5/0.2 | 10 | 1 | 1 | 1 | 1 | 5-10 |
| 0.25/0.1 | 48 | 1 | 1 | 1 | 15-20 | 5-10 |
| 1.0/0.2 | E | 1 | 1 | 1 | 5-10 | 5-10 |
| 0.75/0.15 | E | 1 | 1 | 1 | 30-45 | N.D. |

E = Stable Emulsion
N.D. = No Drying
[(1)]Where "X" is the surfactant system in ratio of:
Linear DDBSA/i-propylamine - 2.0 parts by wt.
SURFYNOL 104 - 1.5 parts by wt.
n-Octanol - 1.5 parts by wt.
and "P" is the phosphate ester, STRODEX MO-100

TABLE IX
PHASE SEPARATION PERFORMANCE AND MINIMUM TIME FOR DEWATERING FOR SYSTEM "X-P" AT LOW CONCENTRATION LEVELS IN FC 113

| WT. % TOTAL SURFACTANT[(1)] | AQ. PHASE SEP'N AT 60 MIN., % | MIN. TIME, (SEC.) FOR: | | | | |
|---|---|---|---|---|---|---|
| | | Al | Brass | SS304 | Glass | $Al_2O_3$ |
| 0.6 | 95 | 1 | 1 | 10-20 | 3-5 | 20-30 |
| 0.3 | 48 | 1 | 1 | 1 | 20-30 | 5-10 |
| 0.2 | — | 1 | 3-5 | 10-12 | 5-10 | 5-10 |

[(1)]Where surfactant composition ratios are given as:
DDBSA (BIO-SOFT S-100)/i-propylamine    2.0 parts by wt.
SURFYNOL 104                             1.5 parts by wt.
n-Octanol                                1.5 parts by wt.
STRODEX MO-100                           1.0 parts by wt.

TABLE IX-continued total 6.0 parts by wt.

What is claimed is:

1. A solvent-surfactant drying composition comprising essentially
   (a) 1,1,2-trichloro-1,2,2-trifluoroethane, and containing
   (b) from about 0.05 to about 0.5 weight percent linear dodecylbenzene sulfonic/amine salt and
   (c) from about 0.05 to about 0.5 weight percent of polyphosphoric ester acid anhydride comprising a reaction product of an aliphatic alcohol of 4–12 carbon atoms and the dimeric phosphoric acid derived from $P_2O_5$ and
   (d) from about 0.05 to about 1 weight percent of a demulsifier selected from the group consisting of (i) acetylenic diols and mixtures thereof with (ii) aliphatic primary alcohols of six to twelve carbon atoms and (iii) phosphate tri-esters having carbon substituents of three to twelve carbon atoms.

2. The composition of claim 1 wherein the demulsifier is 2,4,7,9-tetramethyl-5-decyn-4,7 diol and an aliphatic primary alcohol of six to twelve carbon atoms.

3. The composition of claim 2 wherein the aliphatic primary alcohol is n-octyl alcohol.

4. The composition of claim 1 wherein the relative ratio of (b) to (d) is 3:1.

5. The composition of claim 1 wherein the relative ratio of (c) to (b) plus (d) is 1:15.

6. A process of cleaning and/or drying nonabsorbent articles comprising the steps of:
   (a) immersing the article in a solution having the composition of claim 1 for a period of less than two minutes;
   (b) removing the article from said solution; and
   (c) drying said article by effecting evaporation of any solution in less than 30 seconds after removal of the article from said solution.

* * * * *